Patented Mar. 11, 1952

2,589,061

UNITED STATES PATENT OFFICE 2,589,061

HYDROAROMATIC ANALOGUES OF CERTAIN HYDROPHILE HYDROXYLATED SYNTHETIC PRODUCTS AND METHOD OF MAKING SAME

Melvin De Groote, St. Louis, and Bernhard Keiser, Webster Groves, Mo., assignors to Petrolite Corporation, Ltd., Wilmington, Del., a corporation of Delaware No Drawing. Original application December 8, 1948, Serial No. 64,443, now Patent No. 2,574,536, dated November 13, 1951. Divided and this application February 3, 1949, Serial No. 74,474

7 Claims. (Cl. 260—67)

The present invention is concerned with certain new chemical products, compounds or compositions having useful application in various arts. This invention is a continuation in part of three of our copending applications, Serial Nos. 726,201 and 726,204, both filed February 3, 1947, both now abandoned, and Serial No. 8,722 filed February 16, 1948 now Patent 2,499,365, granted March 7, 1950 and is a division of our copending application, Serial No. 64,443 filed December 8, 1948, now Patent 2,574,536, granted November 13, 1951. It includes methods or procedures for manufacturing said new products, compounds or compositions as well as the products, compounds or compositions themselves. Said new compositions are the hydroaromatic analogues of certain hydrophile hydroxylated synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

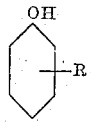

in which R is a hydrocarbon radical having at least 4 and not more than 12 carbon atoms and substituted in the 2,4,6, position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application, Serial No. 64,443, filed December 8, 1948.

The new products are useful as wetting, detergent and levelling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as for example, for cosmetics, spray oils, water-repellent textile finishes; as lubricants, etc.

The new products may be prepared by initial production of the resin from a difunctional phenol and an aldehyde, followed by oxyalkylation of the resin to convert it into a hydrophile hydroxylated derivative followed by hydrogenation of such hydrophile hydroxylated derivative or by hydrogenation of the resin followed by oxyalkylation of the hydrogenated resin.

The production of the resins and their oxyalkylation to produce hydrophile hydroxylated derivatives is described in detail in our Patents 2,499,370 and 2,541,991, and reference is made to those patents for a description of these operations and to Examples 1a through 103a and 1b through 18b and the tables which appear in columns 51 through 55 for specific examples of suitable resins and oxyalkylated resins and to the tables at columns 31 through 46 of Patent 2,541,991 for further specific examples of suitable oxyalkylated resins.

The following examples illustrate the hydrogenation of certain of the oxyalkylated resins described in Patent 2,541,991 and thus illustrate products of the invention.

*Example 1c*

The oxyalkylated xylene-containing resin employed was the one identified as 118b in Patent 2,541,991. Approximately 600 grams of the xylene-containing oxyalkylated resin was subjected to vacuum distillation at a temperature of less than 200° C. to eliminate the xylene. 300 grams of this material was placed in an autoclave along with 38.7 grams of Raney nickel. The apparatus employed is a stirring type super-pressure autoclave manufactured by the American Instrument Company, Silver Spring, Maryland, and described in their catlog No. 406 as the 4⅜" series. The instrument was, of course, equipped with all the conventional fittings. The stirring speed employed was approximately 450 R. P. M. The following table shows the time required to hydrogenate. The initial time period shows the starting period in the morning and the second and third columns show the gauge pressure in pounds per square inch and the temperature in degrees centigrade:

| Time | Pressure | Temperature | Time | Pressure | Temperature |
|---|---|---|---|---|---|
| 9:05 | 1,300 | 25 | 11:23 | 1,800 | 170 |
| 9:24 | 1,400 | 50 | 11:34 | 1,850 | 178 |
| 9:27 | 1,430 | 58 | 11:41 | 1,850 | 179 |
| 9:33 | 1,500 | 63 | 12:03 | 1,790 | 166 |
| 9:36 | 1,550 | 83 | 12:29 | 1,770 | 168 |
| 9:40 | 1,590 | 92 | 1:15 | 1,780 | 169 |
| 9:44 | 1,620 | 102 | 1:30 | 1,820 | 177 |
| 9:47 | 1,665 | 112 | 1:35 | 1,850 | 183 |
| 9:52 | 1,700 | 122 | 1:43 | 1,880 | 195 |
| 9:58 | 1,750 | 135 | 1:50 | 1,885 | 201 |
| 10:02 | 1,770 | 140 | 1:57 | 1,850 | 203 |
| 10:06 | 1,780 | 144 | 2:06 | 1,830 | 198 |
| 10:10 | 1,780 | 145 | 2:14 | 1,850 | 205 |
| 10:15 | 1,780 | 145 | 2:23 | 1,880 | 217 |
| 10:21 | 1,780 | 147 | 2:30 | 1,860 | 227 |
| 10:37 | 1,790 | 154 | 2:40 | 1,810 | 234 |
| 10:49 | 1,830 | 164 | 2:48 | 1,740 | 225 |
| 10:53 | 1,860 | 170 | 3:00 | 1,720 | 222 |
| 11:00 | 1,865 | 178 | 3:08 | 1,740 | 228 |
| 11:11 | 1,830 | 172 | 3:16 | 1,720 | 230 |
| 11:18 | 1,810 | 168 | 3:20 | 1,700 | 230 |

The next morning after standing overnight the temperature had dropped to 28° C. and the pressure to 850 lbs. The material was removed by draining the material from the autoclave and then washing with approximately 400 to 500 grams of isopropyl alcohol. This alcohol was then removed by vacuum distillation at less than 100° C. The hydrogenated product obtained was amber in color and less viscous than the original material. The solubility of the material was not particularly changed in comparison with the product prior to hydrogenation. Tests for aromatic character such as decolorization of bromine water indicated that the product is entirely, or nearly entirely, converted to a hydroaromatic compound.

*Example 2c*

The procedure followed was exactly the same as in 1c preceding. Conditions of operation are presented in a subsequent table. The presentation of this table is identical to that appearing in 1c preceding. The oxyalkylated resin employed was 112b of Patent 2,541,991. It was freed from solvent in identically the same manner described in 1c preceding. 300 grams of the solvent free oxyalkylated resin was mixed with 45 grams of Raney nickel.

| Time | Pressure | Temperature | Time | Pressure | Temperature |
|---|---|---|---|---|---|
| 9:55 | 1,300 | 26 | 1:45 | 1,890 | 212 |
| 10:11 | 1,370 | 46 | 1:48 | 1,890 | 220 |
| 10:21 | 1,500 | 75 | 1:53 | 1,870 | 225 |
| 10:32 | 1,620 | 99 | 2:00 | 1,830 | 227 |
| 10:40 | 1,710 | 123 | 2:05 | 1,800 | 222 |
| 10:50 | 1,790 | 148 | 2:10 | 1,790 | 220 |
| 10:55 | 1,820 | 156 | 2:15 | 1,790 | 220 |
| 11:00 | 1,850 | 166 | 2:25 | 1,790 | 223 |
| 11:05 | 1,870 | 178 | 2:30 | 1,780 | 225 |
| 11:10 | 1,875 | 183 | 2:35 | 1,770 | 224 |
| 11:16 | 1,850 | 181 | 2:40 | 1,760 | 222 |
| 11:20 | 1,830 | 177 | 2:45 | 1,760 | 222 |
| 11:25 | 1,800 | 172 | 2:50 | 1,770 | 226 |
| 11:30 | 1,790 | 168 | 2:55 | 1,770 | 228 |
| 11:35 | 1,790 | 166 | 2:57 | 1,770 | 230 |
| 11:40 | 1,810 | 169 | 3:00 | 1,760 | 229 |
| 11:45 | 1,830 | 175 | 3:05 | 1,750 | 226 |
| 11:50 | 1,835 | 180 | 3:15 | 1,740 | 225 |
| 11:55 | 1,820 | 180 | 3:25 | 1,750 | 229 |
| 12:00 | 1,800 | 176 | 3:30 | 1,720 | 226 |
| 12:25 | 1,770 | 167 | 3:45 | 1,600 | 202 |
| 1:07 | 1,780 | 171 | 4:00 | 1,490 | 180 |
| 1:30 | 1,850 | 192 | 4:30 | 1,310 | 139 |
| 1:39 | 1,880 | 205 | 4:50 | 1,240 | 120 |

The next morning after standing overnight the temperature had dropped to 25° and the pressure to 930 pounds. The material was removed from the autoclave and freed from catalyst in the same manner described in Example 1c preceding. The alcohol employed is likewise removed in the same manner as described in Example 1c. The hydrogenated product obtained was amber in color and appeared to be less viscous than the material prior to hydrogenation. Likewise, hydrogenation did not particularly change water solubility.

*Example 3c*

The procedure followed was exactly the same as in 1c preceding. Conditions of operation are presented in a subsequent table. The presentation of this table is identical to that appearing in 1c preceding. The oxyalkylated resin employed was 116b of Patent 2,541,991. It was freed from solvent in identically the same manner described in 1c preceding. 300 grams of the solvent free oxyalkylated resin was mixed with 45 grams of Raney nickel.

| Time | Pressure | Temperature | Time | Pressure | Temperature |
|---|---|---|---|---|---|
| 10:00 | 1,500 | 27 | 11:40 | 1,960 | 127 |
| 10:05 | 1,420 | 27 | 11:50 | 1,920 | 120 |
| 10:10 | 1,470 | 33 | 12:00 | 1,890 | 113 |
| 10:20 | 1,540 | 58 | 1:10 | 1,690 | 77 |
| 10:30 | 1,650 | 85 | 1:20 | 1,690 | 75 |
| 10:40 | 1,770 | 103 | 1:35 | 1,650 | 70 |
| 10:45 | 1,820 | 125 | 1:40 | 1,650 | 68 |
| 10:50 | 1,890 | 138 | 1:50 | 1,640 | 65 |
| 11:00 | 2,020 | 155 | 2:00 | 1,640 | 63 |
| 11:10 | 2,100 | 158 | 2:10 | 1,620 | 61 |
| 11:20 | 2,080 | 145 | 2:35 | 1,580 | 58 |
| 11:30 | 2,000 | 138 | 4:50 | 1,480 | 43 |

The next morning after standing overnight the temperature had dropped to 28° C. and the pressure to 1150 pounds. The material was removed from the autoclave and freed from catalyst in the same manner described in Example 1c preceding. The alcohol employed is likewise removed in the same manner as described in Example 1c. The hydrogenated product obtained was amber in color and appeared to be less viscous than the material prior to hydrogenation. Likewise, hydrogenation did not particularly change water solubility.

*Example 4c*

The procedure followed was exactly the same as in 1c preceding. Conditions of operation are presented in a subsequent table. The presentation of this table is identical to that appearing in 1c preceding. The oxyalkylated resin employed was 115b of Patent 2,541,991. It was freed from solvent in identically the same manner described in 1c preceding. 300 grams of the solvent free oxyalkylated resin was mixed with 45 grams of Raney nickel. In this instance, the resin was a solid and 300 grams of absolute ethyl alcohol was added as a solvent prior to hydrogenation.

| Time | Pressure | Temperature | Time | Pressure | Temperature |
|---|---|---|---|---|---|
| 10:00 | 1,500 | 32 | 11:40 | 2,120 | 172 |
| 10:05 | 1,430 | 32 | 11:50 | 2,130 | 175 |
| 10:10 | 1,470 | 35 | 12:00 | 2,160 | 172 |
| 10:20 | 1,540 | 58 | 1:10 | 2,090 | 152 |
| 10:30 | 1,620 | 85 | 1:20 | 2,080 | 152 |
| 10:40 | 1,710 | 115 | 1:35 | 2,100 | 157 |
| 10:45 | 1,780 | 130 | 1:40 | 2,120 | 160 |
| 10:50 | 1,830 | 145 | 1:50 | 2,150 | 165 |
| 11:00 | 2,000 | 168 | 2:00 | 2,170 | 170 |
| 11:10 | 2,080 | 172 | 2:10 | 2,180 | 175 |
| 11:20 | 2,080 | 165 | 2:35 | 2,060 | 150 |
| 11:30 | 2,090 | 167 | 4:50 | 1,660 | 78 |

The next morning after standing overnight the temperature had dropped to 29° C. and the pressure to 1,000 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color and had a greenish iridescence. The original oxyalkylated resin was brown in color and more viscous than the hydrogenated oxyalkylated resin. There was no particular change in water solubility before and after hydrogenation.

*Example 5c*

The procedure followed was exactly the same as in 4c preceding. Conditions of operation are presented in a subsequent table. The presentation of this table is identical to that appearing in 1c preceding. The oxyalkylated resin employed was 106b of Patent 2,541,991. It was freed from solvent in identically the same manner as described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:30 | 1,500 | 30 | 10:30 | 2,000 | 182 |
| 8:40 | 1,460 | 38 | 10:55 | 1,898 | 163 |
| 8:55 | 1,560 | 74 | 11:15 | 1,870 | 163 |
| 9:00 | 1,600 | 91 | 11:20 | 1,890 | 167 |
| 9:10 | 1,700 | 123 | 11:30 | 1,950 | 180 |
| 9:20 | 1,820 | 153 | 11:40 | 1,940 | 180 |
| 9:30 | 1,970 | 175 | 11:50 | 1,900 | 173 |
| 9:40 | 2,010 | 180 | 12:00 | 1,880 | 169 |
| 9:50 | 1,970 | 172 | 1:00 | 1,840 | 170 |
| 10:00 | 1,930 | 165 | 1:10 | 1,830 | 172 |
| 10:10 | 1,910 | 163 | 1:45 | 1,810 | 171 |
| 10:20 | 1,970 | 175 | 2:00 | 1,810 | 172 |

The next morning after standing overnight the temperature had dropped to 31° C. and the pressure to 1030 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

*Example 6c*

The procedure followed was exactly the same as in 4c preceding. Conditions of operation are presented in a subsequent table. The presentation of this table is identical to that appearing in 1c preceding. The oxyalkylated resin employed was 107b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:30 | 1,500 | 30 | 10:30 | 2,070 | 185 |
| 8:40 | 1,500 | 40 | 10:55 | 1,930 | 163 |
| 8:55 | 1,600 | 75 | 11:15 | 1,950 | 152 |
| 9:00 | 1,630 | 89 | 11:20 | 1,960 | 155 |
| 9:10 | 1,720 | 117 | 11:30 | 2,030 | 170 |
| 9:20 | 1,850 | 145 | 11:40 | 2,110 | 185 |
| 9:30 | 1,960 | 172 | 11:50 | 2,100 | 182 |
| 9:40 | 2,020 | 180 | 12:00 | 2,040 | 175 |
| 9:50 | 2,010 | 176 | 1:00 | 2,020 | 172 |
| 10:00 | 1,990 | 168 | 1:10 | 2,040 | 175 |
| 10:10 | 1,990 | 165 | 1:45 | 2,010 | 175 |
| 10:20 | 2,050 | 177 | 2:00 | 2,010 | 176 |

The next morning after standing overnight the temperature had dropped to 31° C. and the pressure to 1380 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

*Example 7c*

The procedure followed was exactly the same as in 4c preceding. Conditions of operation are presented in a subsequent table. The presentation of this table is identical to that appearing in 1c preceding. The oxyalkylated resin employed was 114b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:30 | 1,500 | 30 | 10:50 | 2,110 | 180 |
| 8:40 | 1,510 | 40 | 11:00 | 2,140 | 184 |
| 8:50 | 1,570 | 58 | 11:35 | 2,010 | 168 |
| 9:00 | 1,620 | 88 | 11:50 | 2,000 | 158 |
| 9:10 | 1,720 | 118 | 1:20 | 2,210 | 184 |
| 9:20 | 1,840 | 150 | 1:40 | 2,020 | 165 |
| 9:30 | 1,980 | 177 | 2:10 | 1,980 | 160 |
| 9:40 | 2,070 | 187 | 2:35 | 2,030 | 173 |
| 9:50 | 2,150 | 192 | 2:50 | 2,050 | 175 |
| 10:10 | 2,110 | 181 | 3:00 | 2,090 | 180 |
| 10:20 | 2,090 | 173 | 3:30 | 1,900 | 155 |
| 10:30 | 2,100 | 176 | | | |

The next morning after standing overnight the temperature had dropped to 28° C. and the pressure to 1190 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

Example 8c

The procedure followed was exactly the same as in 4c preceding. Conditions of operation are presented in a subsequent table. The presentation of this table is identical to that appearing in 1c preceding. The oxyalkylated resin employed was 117b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:30 | 1,500 | 30 | 10:50 | 2,230 | 170 |
| 8:40 | 1,520 | 40 | 11:00 | 2,230 | 171 |
| 8:50 | 1,590 | 58 | 11:35 | 2,250 | 175 |
| 9:00 | 1,670 | 86 | 11:50 | 2,250 | 173 |
| 9:10 | 1,770 | 115 | 1:20 | 2,220 | 173 |
| 9:20 | 1,910 | 147 | 1:40 | 2,220 | 175 |
| 9:30 | 2,110 | 173 | 2:10 | 2,200 | 173 |
| 9:40 | 2,200 | 179 | 2:35 | 2,190 | 174 |
| 9:50 | 2,190 | 172 | 2:50 | 2,190 | 175 |
| 10:10 | 2,200 | 168 | 3:00 | 2,180 | 173 |
| 10:20 | 2,220 | 172 | 3:30 | 2,020 | 148 |
| 10:30 | 2,230 | 173 | | | |

The next morning after standing overnight the temperature had dropped to 28° C. and the pressure to 1240 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

Example 9c

The procedure followed was exactly the same as in 4c preceding. Conditions of operation are presented in a subsequent table. The presentation of this table is identical to that appearing in 1c preceding. The oxyalkylated resin employed was 104b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 9:10 | 1,500 | 22 | 10:50 | 1,850 | 170 |
| 9:20 | 1,505 | 38 | 11:00 | 1,870 | 172 |
| 9:30 | 1,600 | 69 | 11:10 | 1,850 | 174 |
| 9:40 | 1,680 | 105 | 11:20 | 1,850 | 173 |
| 9:50 | 1,770 | 138 | 11:30 | 1,850 | 172 |
| 10:00 | 1,815 | 155 | 11:40 | 1,850 | 173 |
| 10:10 | 1,850 | 170 | 11:50 | 1,830 | 174 |
| 10:20 | 1,880 | 175 | 1:00 | 1,810 | 172 |
| 10:30 | 1,880 | 173 | 3:40 | 1,630 | 168 |
| 10:40 | 1,850 | 170 | | | |

The next morning after standing overnight the temperature had dropped to 28° C. and the pressure to 1110 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

Example 10c

The procedure followed was exactly the same as in 4c preceding. Conditions of operation are presented in a subsequent table. The presentation of this table is identical to that appearing in 1c preceding. The oxyalkylated resin employed was 108b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 9:10 | 1,500 | 22 | 10:50 | 2,130 | 170 |
| 9:20 | 1,480 | 36 | 11:00 | 2,150 | 170 |
| 9:30 | 1,600 | 68 | 11:10 | 2,150 | 172 |
| 9:40 | 1,675 | 100 | 11:20 | 2,150 | 172 |
| 9:50 | 1,760 | 128 | 11:30 | 2,150 | 170 |
| 10:00 | 1,895 | 149 | 11:40 | 2,150 | 173 |
| 10:10 | 2,020 | 167 | 11:50 | 2,140 | 172 |
| 10:20 | 2,100 | 172 | 1:00 | 2,130 | 172 |
| 10:30 | 2,130 | 173 | 3:20 | 2,070 | 171 |
| 10:40 | 2,130 | 172 | | | |

The next morning after standing overnight the temperature had dropped to 28° C. and the pressure to 1290 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

Example 11c

The procedure followed was exactly the same as in 4c preceding. Conditions of operation are presented in a subsequent table. The presentation of this table is identical to that appearing in 1c preceding. The oxyalkylated resin employed was 109b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:15 | 1,500 | 28 | 11:00 | 2,060 | 168 |
| 8:40 | 1,590 | 77 | 11:20 | 2,100 | 175 |
| 8:50 | 1,690 | 115 | 11:40 | 2,130 | 179 |
| 9:10 | 1,890 | 157 | 1:10 | 2,060 | 173 |
| 9:30 | 2,040 | 175 | 1:45 | 2,050 | 171 |
| 10:00 | 2,070 | 173 | 2:15 | 2,050 | 171 |
| 10:30 | 2,080 | 172 | | | |

The next morning after standing overnight the temperature had dropped to 25° C. and the pressure to 1330 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

*Example 12c*

The procedure followed was exactly the same as in 4c preceding. Conditions of operation are presented in a subsequent table. The presentation of this table is identical to that appearing in 1c preceding. The oxyalkylated resin employed was 121b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:15 | 1,500 | 28 | 11:00 | 2,100 | 174 |
| 8:40 | 1,610 | 73 | 11:20 | 2,100 | 174 |
| 8:50 | 1,700 | 115 | 11:40 | 2,120 | 177 |
| 9:10 | 1,900 | 162 | 1:10 | 2,060 | 172 |
| 9:30 | 2,040 | 176 | 1:45 | 2,060 | 172 |
| 10:00 | 2,060 | 171 | 2:15 | 2,070 | 174 |
| 10:30 | 2,080 | 171 | | | |

The next morning after standing overnight the temperature had dropped to 25° C. and the pressure to 1330 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

*Example 13c*

The procedure followed was exactly the same as in 4c preceding. Conditions of operation are presented in a subsequent table. The presentation of this table is identical to that appearing in 1c preceding. The oxyalkylated resin employed was 110b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:20 | 1,490 | 22 | 10:45 | 2,110 | 174 |
| 9:05 | 1,800 | 143 | 11:00 | 2,100 | 174 |
| 9:30 | 2,050 | 175 | 12:40 | 2,050 | 170 |
| 9:45 | 2,060 | 173 | 1:30 | 2,050 | 175 |
| 10:15 | 2,100 | 173 | 2:20 | 2,000 | 170 |

The next morning after standing overnight the temperature had dropped to 26° C. and the pressure to 1300 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

*Example 14c*

The procedure followed was exactly the same as in 4c preceding. Conditions of operation are presented in a subsequent table. The presentation of this table is identical to that appearing in 1c preceding. The oxyalkylated resin employed was 113b of Patent 2,541,991. It was freed from solvent in identically the same manner described in 1c preceding. 300 grams of the solvent free oxyalkylated resin was mixed with 45 grams of Raney nickel, along with 300 grams of absolute ethyl alcohol.

| Time | Pressure | Temperature | Time | Pressure | Temperature |
|---|---|---|---|---|---|
| 8:20 | 1,490 | 22 | 10:45 | 2,060 | 172 |
| 9:05 | 1,790 | 143 | 11:00 | 2,050 | 173 |
| 9:30 | 2,020 | 173 | 12:40 | 2,000 | 172 |
| 9:45 | 2,060 | 173 | 1:30 | 1,980 | 173 |
| 10:15 | 2,070 | 173 | 2:20 | 1,950 | 172 |

The next morning after standing overnight the temperature had dropped to 27° C. and the pressure to 1200 pounds. The material was removed from the autoclave and freed from catalyst in the same manner as described in Example 1c preceding. The amount of isopropyl alcohol added was only one-half the amount used in Example 1c for the reason that ethyl alcohol had been added prior to hydrogenation. The solvent subsequently removed by vacuum distillation was, of course, a mixture of ethyl and propyl alcohols. The material recovered in this instance was amber in color. The original oxyalkylated resin was brown in color and more viscous than the hydrogenated oxyalkylated resin. There was no particular change in water solubility before and after hydrogenation.

The following examples illustrate the production of the new products by hydrogenating the resin and oxyalkylating the resulting hydrogenated resin.

*Example 1d*

A resin exemplified by Example 3a of Patent 2,499,370 is subjected to vacuum distillation so as to remove any aromatic solvent employed during the manufacturing process. The resin, while hot, is mixed with ethyl alcohol under suitable condenser arrangement, or is mixed after cooling. The amount of alcohol added is usually about equal by weight, to the weight of the resin, with moderate variation. If the resinous product itself is soft enough, one may avoid the addition of a solvent entirely, if desirable. Instead of employing ethyl alcohol one may, of course, employ some other low molal alcohol, but it is our preference to employ ethyl alcohol for reasons previously noted. The amount of Raney nickel added, based on a charge of 500 grams of the resin and 500 grams of alcohol, is approximately 50 grams of Raney nickel. This represents approximately 10%, based on the weight of the resin. The mixture was agitated during the hydrogenation process and the time of hydrogenation was five hours. The temperature of hydrogenation was approximately 185° C. and the pressure 1300 to 1500 pounds per square inch cold. The pressure during the reaction may vary, due to vapor pressure of solvent employed, rate of hydrogen absorption, etc. and so is somewhat difficult to predict, but invariably is moderately higher, for instance, under above conditions one may expect pressures of 1750–1500 lbs. per square inch. The operation is complete when no more hydrogen is absorbed under conditions which would obviously convert an aromatic compound into an alicyclic compound. The completion of the operation is followed by separation of the catalyst by suitable procedure such as hot filtration. If proper precautions are taken, the catalyst is, of course, available for reuse without activation. If required, however, the catalyst may have to be reactivated before being used again. As has been previously pointed out, the operating procedures are conventional and have no effect on the alcohol pressure and hydrogenolysis does not take place— merely hydrogenation. Attention is again directed to the aforementioned Ubben Patents U. S. Nos. 2,072,142 and 2,072,143, both dated March 2, 1937.

The hydrogenated resin has much the same appearance as the product prior to hydrogenation, except hydrogenation usually shows a tendency to yield a lighter colored and more brittle product, and in some instances, yields a product which is almost water-white and extremely brittle. After hydrogenation, the alcohol must be removed before subjecting the resin to oxyalkylation, for the reason that the alcohol is reactive. Our preference is to remove the alcohol by vacuum distillation and then add a suitable solvent to the hot resin, for instance, xylene or any one of the solvents previously mentioned. It is to be noted that hydrogenation does not particularly change the viscosity of the product, although certain other factors may be changed. In other words, if the resin happens to be a thick, resinous or somewhat rubbery oil, instead of having a hard, resinous character, hydrogenation does not particularly change the physical nature.

*Example 2d*

Although we have used a variety of equipment, particularly on a laboratory scale for hydrogenation, our preference particularly in connection with the hydrogenation of resins, is to use the instrument previously described under the heading identified as Example 1c. Using this particular device, we have operated at temperatures in the neighborhood of 225° C., 235° C., and slightly in excess thereof and have used pressures up to and in the neighborhood of 1,900 pounds. It will be noted that these conditions of hydrogenation are more drastic than those described in the Example 1c immediately preceding. Based on tests with bromine water, etc., we are inclined to believe that more drastic conditions of hydrogenation, as employed in these subsequent examples, insure more complete conversion into the alicyclic compound than those described in Example 1c immediately preceding. We are not convinced that other reactions may not take place and, in fact, at times have obtained a tendency towards insolubilization which perhaps is still obscure. In order to save space, we are simply outlining the fact that the general procedure used is that described above, to wit, a hydrogenation time of approximately seven hours, a hydrogenation temperature at the maximum in the neighborhood of 200° C. to 235° C., and a hydrogenation pressure running up to and short of 2,000 pounds per square inch. The ratio of the material to be hydrogenated, the catalyst, the amount of catalyst and the amount of absolute ethyl alcohol added have been the same as the experiments beginning with Example 4c in Part 3. In other words, the removal of the aromatic solvent which is susceptible to hydrogenation has been described previously. 300 grams of this resin was mixed with 300 grams of absolute alcohol and 45 grams of Raney nickel. The material was then subjected to hydrogenation as previously indicated. At the completion of the hydrogenation period and after cooling overnight, the reaction mass was mixed with another 300 or 400 grams of isopropyl alcohol and then filtered to remove the catalyst. The mixed alcohols were then removed as in Example 4c et seq. In this particular experiment, the resin employed was the one identified as Example 4a in Patent 2,499,370.

*Example 3d*

The same procedure was followed as in Example 2d preceding except the resin employed was the one identified as Example 8a in Patent 2,499,370.

*Example 4d*

The same procedure was followed as in Example 2d except the resin employed was the one identified as Example 24a in Patent 2,499,370.

*Example 5d*

The same procedure was followed as in Example 2d preceding except the resin employed was the one identified as Example 69a in Patent 2,499,370.

*Example 6d*

The same procedure was followed as in Example 2d preceding except the resin employed was the one identified as Example 70a in Patent 2,499,370.

*Example 7d*

The same procedure was followed as in Example 2d preceding except the resin employed was the one identified as Example 75a in Patent 2,499,370.

Having obtained hydrogenated resins as illustrated by the previous Examples 1d to 7d, it is to be noted that all that is necessary is to subject such resins to oxyalkylation in the same manner employed in the oxyalkylation of the resins which have not been hydrogenated. Examples exemplifying such procedures appear in Patents 2,499,370 and 2,541,991. There has been pointed out, before subjecting the resin to oxyalkylation, any reactive solvent present, such as ethyl alcohol, must be removed and the resin may be oxyalkylated in absence of a solvent of any kind, although this may require unduly high temperatures, but oxyalkylation is conducted preferably in the presence of an inert solvent, such as xylene. The procedure employed is just the same as in the instance of the resins which have not been hydrogenated. Oxyalkylation in this instance initially involves an alcohol instead of a phenol. The oxyalkylation of alcohols is well known. As a matter of fact, the oxyalkylation of phenol or resin having a phenolic hydroxyl, as illustrated by examples of said patents, involves the oxyalkylation of an alcohol after the introduction of the initial alkylene oxide radical. This is obvious by reference to phenol. The reaction between phenol and ethylene oxide initially involves a phenol. The initial resultant is phenoxyethanol. Subsequent oxyalkylation involves an alcoholic hydroxyl and not a phenolic hydroxyl. The same is true in the preceding examples. For this reason the hydrogenated resins previously described and exemplified by Examples 1d to 7d can be subjected to oxyalkylation in various degrees, and in all the ramifications as described previously, and as exemplified by Example 1b and following of Patents 2,499,370 and 2,541,991. The final product is identical whether hydrogenation comes first and oxyalkylation next, or oxyalkylation comes first and hydrogenation next. This is particularly true if there are solvents present and then removed. If, however, there are solvents present and not removed, then it means the solvent which is present will depend upon which happened to be the final step. If the final step was oxyalkylation, then the solvent present will be one exemplified by xylene. If the final step is hydrogenation, then the solvent present will be one exemplified by ethyl alcohol.

The relationship between the hydrogenated resins and the resins described in Patent 2,499,370 preceding is as follows:

| Hydrogenated Resin | Resin |
|---|---|
| 1d | 3a |
| 2d | 4a |
| 3d | 8a |
| 4d | 24a |
| 5d | 69a |
| 6d | 70a |
| 7d | 75a |

Referring to Patent 2,499,370 under heading Example 5b and the subsequent table, there is described specific directions for oxyethylating xylene containing solutions of resins 3a, 4a, 8a, 24a, 69a, 70a, and 75a of Patent 2,499,370. We have taken the hydrogenated resins after the removal of alcohol and rediluted them with xylene so as to give solutions having substantially the same percentage of resin and the same percentage of xylene as shown in the section describing Examples 5b, etc. in Patent 2,499,370, and then subjected these solutions to oxyethylation using the same temperature, same time period, same catalyst as if they were the unhydrogenated resins. The ultimate products obtained are comparable to the materials by different procedure as described above.

We claim:

1. The hydroaromatic analogs of hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

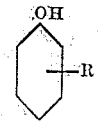

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. The hydroaromatic analogs of hydrophile synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

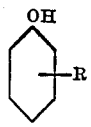

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

3. The hydroaromatic analogs of hydrophile synthetic products; said hydrophile synthetic products being oxyethylation products of (A) ethylene oxide; and (B) an oxyethylation-susceptible, fusible, organic solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula

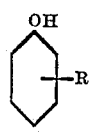

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

4. The product of claim 3 wherein R is substituted in the para position.

5. The product of claim 3 wherein R is a butyl radical substituted in the para position.

6. The product of claim 3 wherein R is an amyl radical substituted in the para position.

7. The product of claim 3 wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,076,624 | De Groote | Apr. 13, 1937 |
| 2,243,330 | De Groote et al. | May 27, 1941 |
| 2,330,474 | De Groote | Sept. 28, 1943 |
| 2,454,541 | Bock et al. | Nov. 23, 1948 |
| 2,454,544 | Bock et al. | Nov. 23, 1948 |

OTHER REFERENCES

Ellis: Chemistry of Synthetic Resins, vol. I, pp. 307, 419; vol. II, pp. 1559–1566 (1935).